(12) United States Patent
Glasser

(10) Patent No.: US 9,055,134 B2
(45) Date of Patent: Jun. 9, 2015

(54) ASYNCHRONOUS AUDIO AND VIDEO IN AN ENVIRONMENT

(71) Applicant: ExXothermic, Inc., Saratoga, CA (US)

(72) Inventor: Lance A. Glasser, Saratoga, CA (US)

(73) Assignee: ExXothermic, Inc., Saratoga, CA (US)

( * ) Notice: Subject to any disclaimer, the term of this patent is extended or adjusted under 35 U.S.C. 154(b) by 0 days.

(21) Appl. No.: 14/472,106

(22) Filed: Aug. 28, 2014

(65) Prior Publication Data

US 2015/0067187 A1    Mar. 5, 2015

Related U.S. Application Data

(60) Provisional application No. 61/871,402, filed on Aug. 29, 2013.

(51) Int. Cl.
| | |
|---|---|
| *G06F 15/16* | (2006.01) |
| *H04L 29/06* | (2006.01) |
| *H04W 88/02* | (2009.01) |
| *G06F 12/00* | (2006.01) |

(52) U.S. Cl.
CPC .............. *H04L 65/60* (2013.01); *H04W 88/02* (2013.01)

(58) Field of Classification Search
USPC .................. 709/203, 217–218, 223–229, 250
See application file for complete search history.

(56) References Cited

U.S. PATENT DOCUMENTS

| | | | |
|---|---|---|---|
| 8,260,320 B2 | 9/2012 | Herz | |
| 8,290,513 B2 | 10/2012 | Forstall et al. | |
| 8,295,855 B2 | 10/2012 | Narayan et al. | |
| 8,332,402 B2 | 12/2012 | Forstall et al. | |
| 8,505,054 B1 | 8/2013 | Kirley | |
| 8,538,685 B2 | 9/2013 | Johnson | |
| 8,548,735 B2 | 10/2013 | Forstall et al. | |
| 8,582,565 B1 | 11/2013 | Morsy et al. | |
| 8,774,172 B2 | 7/2014 | Morsy et al. | |
| 2002/0013144 A1 | 1/2002 | Waters et al. | |
| 2007/0024580 A1 | 2/2007 | Sands et al. | |
| 2007/0174147 A1* | 7/2007 | Klein | 705/28 |
| 2009/0047899 A1 | 2/2009 | Banatre et al. | |
| 2009/0318077 A1 | 12/2009 | Ghahramani | |

(Continued)

FOREIGN PATENT DOCUMENTS

WO    2014058739 A1    4/2014

OTHER PUBLICATIONS

International Search Report and Written Opinion dated Dec. 8, 2014 for PCT Patent Application No. PCT/US2014/053237.

(Continued)

*Primary Examiner* — Zarni Maung
(74) *Attorney, Agent, or Firm* — The Mueller Law Office, P.C.

(57) ABSTRACT

Embodiments of an electronic system for asynchronous audio and video in and environment includes a server with a connection to a wireless access point or a personal digital device that communicates with the server through the wireless access point. The server receives and stores an audio track that is to accompany a public display. The personal digital device acts as a client to the server. A user interface enables a user of the personal digital device to request an audio track corresponding to the public display. The server initiates a stream of the requested audio track to be wirelessly transmitted to and received by the personal digital device. The personal digital device plays at least some of the requested audio track to the user.

12 Claims, 9 Drawing Sheets

(56) References Cited

U.S. PATENT DOCUMENTS

| | | |
|---|---|---|
| 2011/0169634 A1 | 7/2011 | Raj et al. |
| 2012/0114336 A1 | 5/2012 | Kim et al. |
| 2012/0206319 A1* | 8/2012 | Lucero et al. .................. 345/1.3 |
| 2013/0083923 A1* | 4/2013 | Soo et al. ....................... 380/221 |
| 2013/0232242 A1* | 9/2013 | Millington et al. ........... 709/220 |
| 2013/0304804 A1* | 11/2013 | Glasser .......................... 709/203 |
| 2014/0098715 A1 | 4/2014 | Morsy et al. |
| 2014/0317396 A1* | 10/2014 | Hug ............................... 713/150 |

OTHER PUBLICATIONS

Miller, Claire Cain, "A New Google App Gives You Local Information—Before you Ask for It," The New York Times, Sep. 27, 2012, 3 pages.

"The Louvre Audio Guide App," www.louvre.fr/en/louvre-audio-guide-app, viewed Aug. 20, 2013, 3 pages.

Connecting the World to Culture—Antenna International, www.antennainternational.com, viewed Aug. 20, 2013, 3 pages.

Bickersteth, Julian, "Museum Musings—Current Thoughts and Directions in Museum Practice from Around the World," bickersteth.blogspot.com/2011/01/museums-smartphones-and-mobile.html, Jan. 31, 2011, 13 pages.

"Museum Without Walls," A program of the Fairmount Park Art Association, museumwithoutwallsaudio.org, viewed Aug. 20, 2013, 2 pages.

"Museum Audio Guide (for Smartphones or iPads)—Indoor Guide," Tour App Maker, 2013, 3 pages.

"Museum Without Walls—Audio," Association for Public Art, iTunes Preview, https://itunes.apple.com/us/app/museum-without-walls-audio/id632336892?mt=8, viewed Aug. 20, 2013, 2 pages.

\* cited by examiner

Fig. 8

| Personal Digital Device |
|---|
| Location sensing means, e.g., GPS |
| Communication means for conveying information about audio options to and from the user. E.g., touch-sensitive display, audible menu. Also means for the user to select among audio options. Audio play controls. |
| Audio subsystem for converting digital inputs from the network into sound for the user. Can contain a codec for decompressing the audio. |
| Wireless networking means, e.g., 3G, Wi-Fi |
| Computation and memory |

ASYNCHRONOUS AUDIO AND VIDEO IN AN ENVIRONMENT

CROSS-REFERENCE TO RELATED APPLICATIONS

This patent application claims the benefit of U.S. Provisional Patent No. 61/871,402 filed Aug. 29, 2013. The content of U.S. Provisional Patent No. 61/871,402 is incorporated herein by reference.

BACKGROUND

Imagery is everywhere. The eyes are the principal way people gather information about their environment. Audio input is generally the second most common way in which people gather information about their environment. When people can gather information both visually and audibly, each sense reinforces the other. Unfortunately, in many environments rich with visual information, it is difficult to also get audio information because, for instance, if all of the potential audio sources were active in a single environment, there would result an incoherent cacophony. Often these situations arise in public places.

BRIEF DESCRIPTION OF THE DRAWINGS

FIG. 8 is a simplified diagram of subsystems of a personal digital device according to an embodiment of the present invention.

DETAILED DESCRIPTION

The introduction of personal digital devices such as smart phones and other devices, which can localize sound to an individual or small group, e.g., by use of headphones or earbuds, enable a revolution in sound delivery in environments where it was previously impractical. Of course, a user can look at the display screen of the personal digital device too, but in many environments, such as when the user is navigating through or otherwise engaged with the physical world, the user's eyes are, or should be, otherwise busy.

Figure 4:
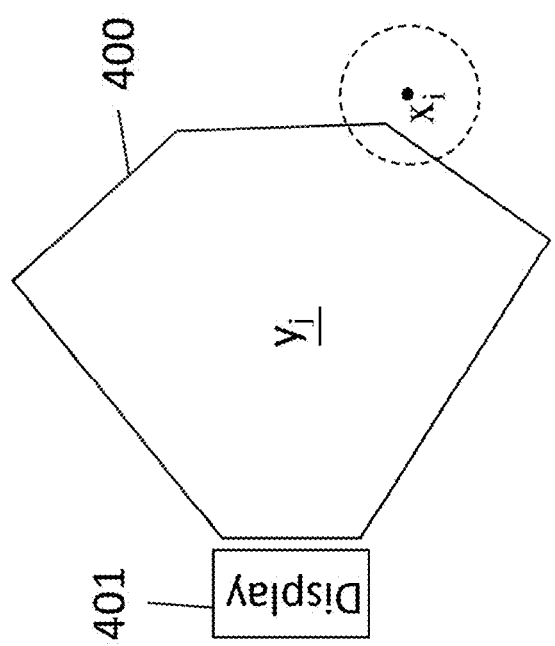
FIG. 4 is a digital display with a polygon representation of the AKL according to an embodiment of the present invention.

The present invention is generally described herein with respect to the field of digital signage. However, it is understood that the present invention is not necessarily so limited, but may also be used in other appropriate situations. In some embodiments, the present invention may be used where the digital signage is allowed in public places/venues, but any corresponding audio channels are not allowed or are not practical to be played out loud, e.g. because of zoning or permitting regulations, because ambient noise is too loud or because the environment typically requires relative silence. For instance, there may be a video display (e.g. 101 or 401, FIGS. 1, 4) in a storefront in Time Square, but zoning regulations prohibit blasting the sound into the street with loudspeakers. The viewing region (e.g. 100 in FIG. 1 or 400 in FIG. 4) for the display is the Audio Kiosk Location "AKL" (defined below). In the example of FIG. 4, the user and personal digital device (located at $x_i$) are outside the AKL, but a "fuzz" (defined below) of the personal digital device intersects the AKL. On the other hand, studies have shown that digital signage is more effective in causing the viewer to take an action if there is an accompanying audio track. To get around this limitation, therefore, in some embodiments the audio stream is transmitted to the user's personal digital device (such as a smart phone, a PDA, Google Glasses, a tablet computer or other appropriate electronic device) wirelessly by a technology such as Bluetooth™, Wi-Fi, near-field communication, LED, infrared or other local wireless means. Alternatively, the audio stream may be transmitted via non-local wireless (e.g. telephonic) means, such as 3G or 4G cell phone technology.

Figure 7:
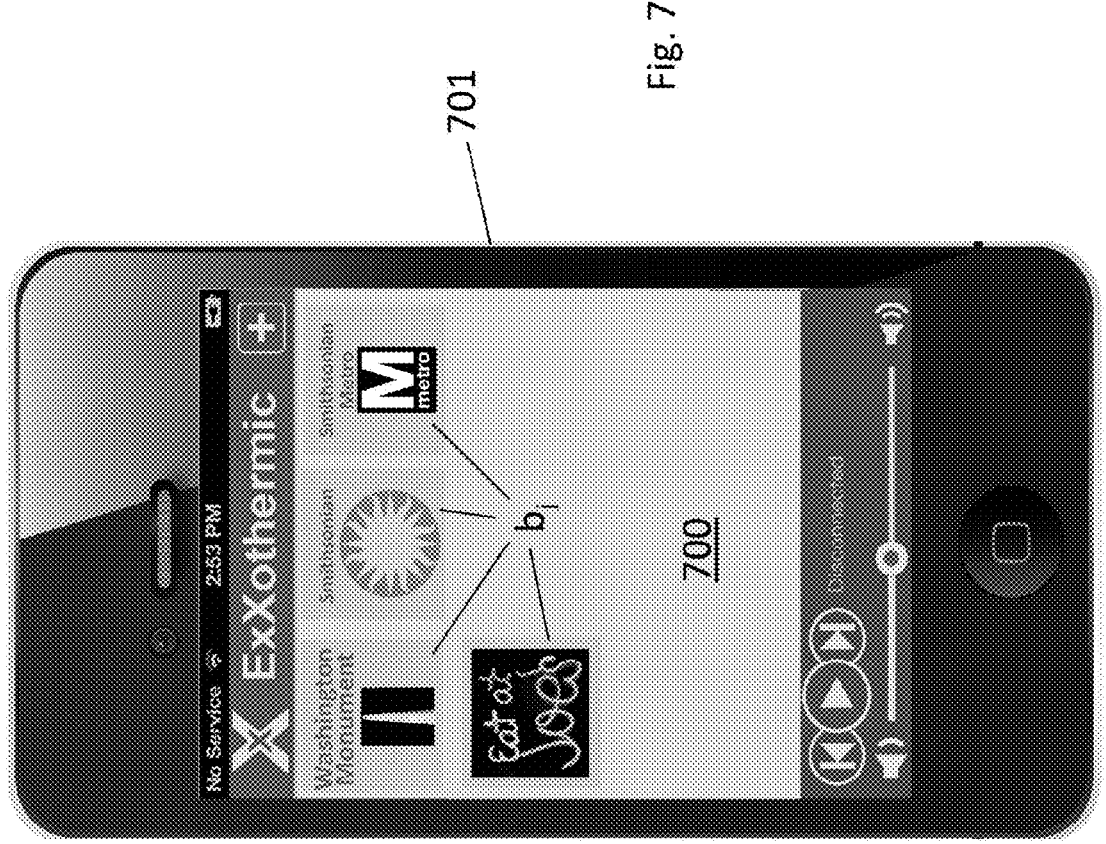
FIG. 7 is a representation of a personal digital device screen for the scenario in FIG. 6 according to an embodiment of the present invention.

Some embodiments may involve an application (app) running on the personal digital device 701, as shown in FIG. 7. The app generally provides a user interface for the user to interact with the present system. Various menus and information may thus be presented to the user through the app. Additionally, in some embodiments, the appearance of the app on the display screen 700 of the personal digital device 701 (i.e. the "skin" of the app) may be modified depending on the location thereof or the public display with which the user is interacting. For example, if the user is in a bar, restaurant or store, the app may show the logo and/or colors of the bar, restaurant or store. Additionally, in some embodiments, an advertiser may choose how to skin the app.

In some embodiments, the audio is compressed before being transmitted to the personal digital device, and the personal digital device uncompresses the audio stream (e.g. with a Codec). The compression can be done on a local or remote audio server. This technique saves bandwidth on network communications. MP3 is an example of a compression format for audio. Other compression formats may also be used. The degree of compression can depend on the needs of the situation.

Some embodiments may involve a publicly available video with a privately available audio. The video and audio may be related but are not necessarily synchronous.

As a non-limiting example, the present invention may be used in the case of a car commercial on a digital sign. In this case, a user may view beautiful images of cars hugging corners in the Alps while the audio track tells the user about the technical specifications, where to find a dealer, etc. The audio and video are asynchronous in that any person can come up to the digital sign and tap a button on their smart phone or other personal digital device and hear the audio track from the beginning or some other logical point for the narration, as the car in the display continues to zip through gorgeous scenery. In another example, there may not be a video on a digital sign at all, but rather a monument, historical marker, natural scene or other point of interest with no movement with which to synchronize.

Figure 9:
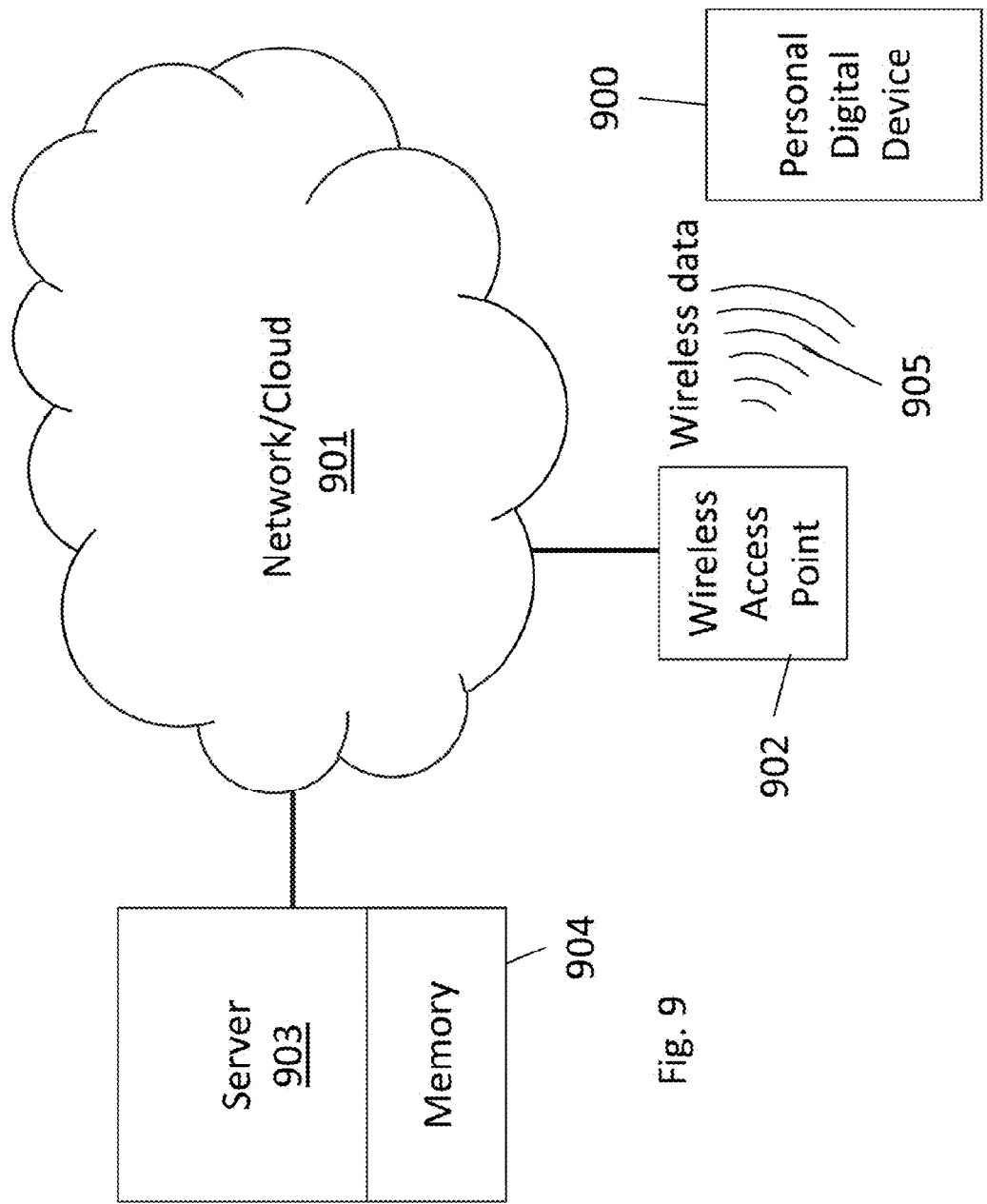
FIG. 9 is a server that acts as an audio source connected to a network and wirelessly connected to a personal digital device according to an embodiment of the present invention.

The user may request an audio track with their personal digital device by, for instance, tapping an icon on the display (See FIG. 7), using speech input, or tapping or clicking a button that scans from one track to the next. As shown in FIG. 9, the personal digital device 900 then communicates over a digital network/cloud 901 and wireless access point 902 to a server 903 to ask for the indicated track stored in a memory 904, which is then delivered via wireless data 905 to the personal digital device 900. The network 901 could be as small as a local area network or as large as the Internet. The communication could be done, for instance, by sending a message via the TCP protocol. By way of example, an audio stream could be sent using the UDP protocol or an audio file might be transmitted with the TCP protocol. Requests from each user could be independently serviced by the server 903 with separate program threads.

In some embodiments, there are multiple audio tracks that correspond to a single public display or digital sign and multiple images or videos that may be presented through the public display or digital sign. Therefore, different users may select different audio tracks for listening, and the images or videos that are presented on the video display 101 or 401 (FIGS. 1, 4) may be adapted to, or may be selected based upon, the audio content requests made by the users. For instance, if users start the audio more often when some imagery is shown than when other imagery is shown, then the more popular imagery may be shown more often. Similarly, if the largest number of users is selecting to hear the audio in a particular language, e.g. a Chinese language, then Chinese language characters may be shown more often on the display. Alternatively, if more users are interested in where to buy an advertised product, then maps of local dealers may be shown more often. Additionally, the audio track or stream that is presented to a particular user may be selected based on predetermined information about the user. For example, if the user is logged into Facebook, then Open Graph information can be used to tailor the audio information. Further, secondary screen imagery (different from the primary imagery shown on the public display) may also be transmitted to the user for presentation on the user's personal digital device. This secondary imagery may also be adapted to, or selected based upon, the user's behavior (e.g. with respect to the user's audio track selections) and the system's knowledge about the user. According to these embodiments, actions by the user (e.g. by interacting with the system described herein or on social media outlets) increase the knowledge of the user by the system. For instance, the system can learn from the selections chosen by the user what type of art they like and what cities they frequent based on how frequently corresponding audio tracks are played.

Some embodiments may be used in situations where the user cannot or should not look at a display screen. For instance, some museums offer audio systems that one can carry while walking in the museum and looking at the exhibits. Although, it would be possible to have such systems deliver text and images in addition to the audio, the user might bump into other people or objects if they were staring at a display screen while walking around. Additionally, the user in this situation would probably rather be looking at the exhibits than at a display screen. (According to some embodiments, the present invention may be thought of as an audio tour guide for the world, not just for a museum.)

Figure 5:
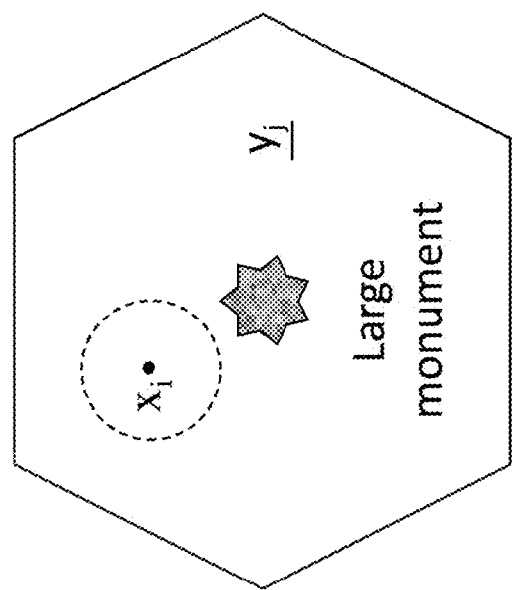
FIG. 5 is an AKL surrounding a large monument according to an embodiment of the present invention.

In some embodiments, the present invention is used in a public location or environment. (It is understood, however, that the present invention is not necessarily so limited, but may also be used in a private environment.) Additionally, in some embodiments, the present invention is used in a location with one or more digital signs. (It is understood, however, that the present invention may also be used in locations without digital signs, e.g. at a monument, a scenic overlook or a storefront rather than a digital sign. All of these situations may be considered a public display. An example in FIG. 5, illustrates this situation in which a user and the "fuzz" of the personal digital device (located at $x_i$) intersects the AKL $y_j$ of a large monument.) Furthermore, in some embodiments, the present invention is used in locations where audio (e.g. that may accompany the digital signs) presented to all people within the environment may not be permitted or may be impractical or undesirable. In some embodiments, therefore, the present invention provides a location-dependent audio service.

In some embodiments, a person may simply create a message in an audio track to be made available to any other person upon entering a particular location. Such a message may be similar to a podcast or an audible version of an SMS or a tweet on Twitter™, but be location-dependent. In this case, the message may be considered as a spatially-specific pod-cast or a geo-tagged "audio-tweet".

Figure 3:
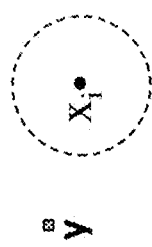
FIG. 3 is a special case when an AKL is a point y according to an embodiment of the present invention.

In some embodiments, the present invention involves an Audio Kiosk Location (AKL) defined as a virtual 5D (e.g. 2D or 3D for space, 1D for time, and 1D for event) Location where audio may be delivered or is accessible. For instance, an AKL may be a GPS coordinate where a user can access specific audio material related to that location. The 5D location of the audio of an AKL is represented herein as $y_j$ (FIGS. 1, 4, 5), which is generally not a point but a region or area. For WiFi, Bluetooth™ or other such wireless technologies the region may be generally, but not necessarily, centered on the location y (FIG. 3) of an appropriate wireless transceiver. (In the example shown in FIG. 3, the "fuzz" of the personal digital device (located at $x_i$) does not intersect the AKL.) For cellular telephone technology the region may be centered on a cellular transceiver or may be any appropriate geographically defined area that is within range of one or more cellular transceivers. A 5D location of an AKL is generally delineated by a set of sets (e.g. a 2D or 3D Location Set, a 1D Time Set and a 1D Event Set) that defines where and when an audio source should be available to a user.

Figure 1:
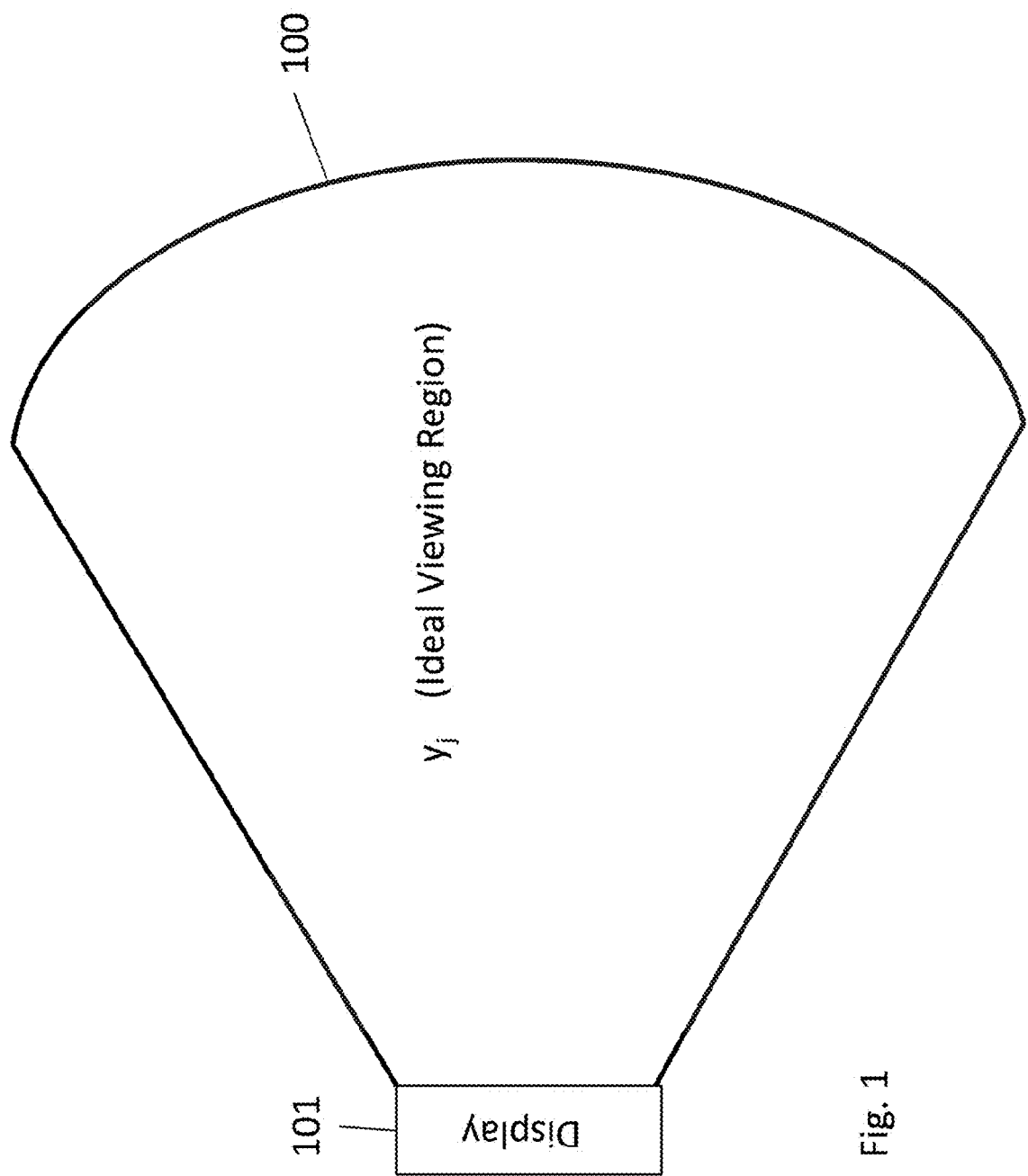
FIG. 1 is a digital display and a region (an "AKL") around the digital display where viewing is ideal according to an embodiment of the present invention.

In some embodiments, the area or vicinity of an AKL is not centered on a digital sign or video display screen, but is an approximate area within which a user can see the digital sign, e.g. a region 100 or 400 in front of the display or digital sign 101 or 401 (FIG. 1 or 4). Some location services on smart phones, for example, enable a user to set up a region where the user is sent an alert or an app is launched if the user crosses into that region.

The Location Set is generally a 2- or 3-D spatial GPS point $p_i$ on the globe or a list of GPS points $(p_1, p_2, p_3, \ldots, p_n)$ defining a closed area on the globe. In some embodiments, this is called a "geofence." An empty Location Set may be used to indicate the entire globe.

The Time Set may include either a single definite time interval (e.g. Sep. 20, 2013 from 9:00 AM to 10:00 PM) or a repeating time interval (e.g. 9:00 AM to 12:00 PM, every day). In some embodiments, an empty Time Set may indicate all time, instead of a finite time period.

The Event Set generally indicates one or more events that may trigger the availability of an audio presentation. For example, an Amber Alert or an emergency broadcast alert may trigger the availability within a city or other region of an audio presentation stating the existence of the alert. Alternatively, a tsunami warning may trigger the availability within a coastal state of an audio presentation telling users to seek high ground. In another alternative, the closing of the doors of a gate at an airport terminal may trigger the availability within the airport terminal of an audio presentation telling travelers that boarding of a plane has ended. In some embodiments, if the event set is empty, then there may be no trigger event, so the audio presentation may simply be always available. In some embodiments, the trigger event may be the passage of a particular point in time, e.g. a time-of-day or a time-of-year or a date.

The Audio Source may generally be either Static Audio or Dynamic Audio, i.e. either stored or streaming. Static (stored) Audio is generally non-real time audio which is not changed very often. Depending on the embodiment, Static Audio may be sourced either locally from a local server or remotely (e.g. from the Internet or a cloud computing system). In some embodiments, a server is a programmable computer system with at least one processor and memory that connects to a digital network. In some embodiments, the server can maintain a database of audio tracks. In some embodiments, segments of Static Audio may be stored on the user's personal digital device for quick access. The personal digital device may have a function that allows the retrieval of recent tracks (or additional tracks associated with recent tracks), either from the Database (see below) or from the personal digital device. In some embodiments, Static Audio may be thought of as audio files (e.g. MP3s) or pointers to audio files. Dynamic (streaming) Audio, on the other hand, is generally near real time audio, such as the audio that corresponds to a TV broadcast. Depending on the embodiment, Dynamic Audio may be sourced either locally from a local server or from a remote location (e.g. from the Internet).

Some embodiments of the present invention generally involve a user with a personal digital device. The personal digital devices may include smart phones, tablet PCs, other portable PCs, iPod Touches™, Google Glasses™, PDAs, portable gaming devices and other electronic devices with wireless communication capabilities. The wireless communication capabilities may include Wi-Fi, cellular phone (e.g. 3G or 4G), Bluetooth™ and other wireless communication technologies. Some embodiments further involve a connection to the Internet. A 5D location of the personal digital device is generally represented herein as $x_i(t)$ (FIGS. 2, 3, 4, 5).

There are multiple ways to determine location information that can be used with embodiments of the present invention. The location information may be used to determine a menu of audio options. The menu of options is generally presented through the user interface of the personal digital device to the user. From the available options, the user may then make desired selections for audio presentations through the personal digital device. For example, a smart phone can use GPS to know that it is in Times Square and hence able to view a Times Square digital sign. In this case, an app running on the smart phone is able to provide the appropriate audio based on location information. Additionally, in some embodiments, the user can select among different start points or tracks for the audio, e.g., technical specifications for an advertised product vs. where to buy the product.

Figure 2:
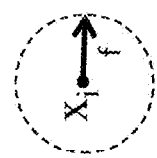
FIG. 2 is a position of a user's personal digital device with a surrounding area of "fuzz" according to an embodiment of the present invention

Spatial location information can be difficult to determine precisely so some "fuzz" (F) is added to the location of the AKL or personal digital device to compensate for this uncertainty. The radius of this fuzz is f. In some embodiments, f may be different in different dimensions or times or regions. The region of the fuzz (F) is generally a sphere of radius f, as shown in FIG. 2. In some embodiments, a special larger fuzz region $f_{alert}$ may be used to alert a user when the user is within or near the region of one of the AKLs.

Some personal digital device, such as iPhones™ and Android™ devices, support location services based on, for instance, 3G, GPS and Wi-Fi ambient signals. Some embodiments of the present invention, therefore, may invoke these native location capabilities to determine when these personal digital devices are within the region of an AKL. In some embodiments, methods to preserve power may be used by, for instance, noting how far away the personal digital device is from the nearest location-dependant AKL and using that information to estimate a time for the next automatic query to determine whether the personal digital device is within the region of an AKL. In some embodiments, the user may override this automatic function and manually "refresh" the location information, thereby causing an immediate query to determine whether the personal digital device is within the region of an AKL.

In some embodiments, the personal digital device is wirelessly connected to a Local Area Network (LAN), e.g. through a wireless access point (WAP), to which a server is connected. In this case, the server may announce its services to the personal digital device. Such services may include dynamic or static audio. By way of example, the LAN could be implemented with Ethernet and Wi-Fi.

In some embodiments in which the personal digital device has a camera or imaging device (e.g. some smartphones, PDAs, Google Glass, etc.), location information may be determined by pointing the camera at the monument or the digital sign. Image recognition software may then identify the monument or digital sign so that the location may be found in a lookup table. Alternatively, a QR code (Quick Response Code) image may be placed near or within the region of the AKL, which can identify the location when the camera takes a picture of the QR code.

In some embodiments, NFC (Near Field Communication) systems can be used to identify the location of an AKL. Alternatively, in some embodiments, the user may manually enter the location into the personal digital device.

In some embodiments, a virtual travel capability is enabled in which a user may select a point on a digital map and then have access to any audio sources that may be available at that location as if the user were really there. In this and some other embodiments, the server for the relevant audio may be available through a cloud computing service.

In some embodiments, the location information is stored on a server in a cloud computing service. Location information may be either a single GPS coordinate (point) or a closed set of points that define a region, enclosed within a perimeter referred to as a geofence. In some embodiments, rather than a GPS coordinate, the location information may be stored, for instance, in the format of a postal address, a zip code, an area code or other appropriate geographic designation. Each of these is referred to herein as a Location Set. Associated with each Location Set is at least one audio track $a_j$. The audio source may also have a button/icon $b_j$ (FIG. 7) representation that may be static or dynamic, text or image/icon on a display screen 700 of a personal digital device 701. In some embodiments, the buttons/icons $b_j$ on the display screen 700 may show thumbnails of the corresponding video imagery, digital sign, monument, etc. Additionally, associated with the audio track $a_j$, there may be a link or code snippet $c_j$ that may be executed. Therefore, some embodiments may involve a database $(y_j, a_j, b_j, c_j)$ where the audio track $a_j$ is either of type stored or streaming. In some embodiments, the audio track $a_j$ is not stored in the database. Instead, the database contains a method, link, pointer or ID for accessing the audio track $a_j$. (The database may be either centralized or distributed. It may also be mirrored.)

In some embodiments, after hearing part of an audio track $a_j$ a user may check out a related website. The related website may be accessed from the link or code snippet information $c_j$, which may be presented as another button on the display screen 700.

When a personal digital device is close to or within a Location Set $y_j$, the associated audio tracks/IDs should become available to the personal digital device. That is, when $$(x_i(t)+F) \cap y_j \qquad (1)$$

In other words, the location of the personal digital device at time t ($x_i(t)$) plus the "fuzz" (F) of the personal digital device intersects the AKL ($y_j$).

Figure 6:
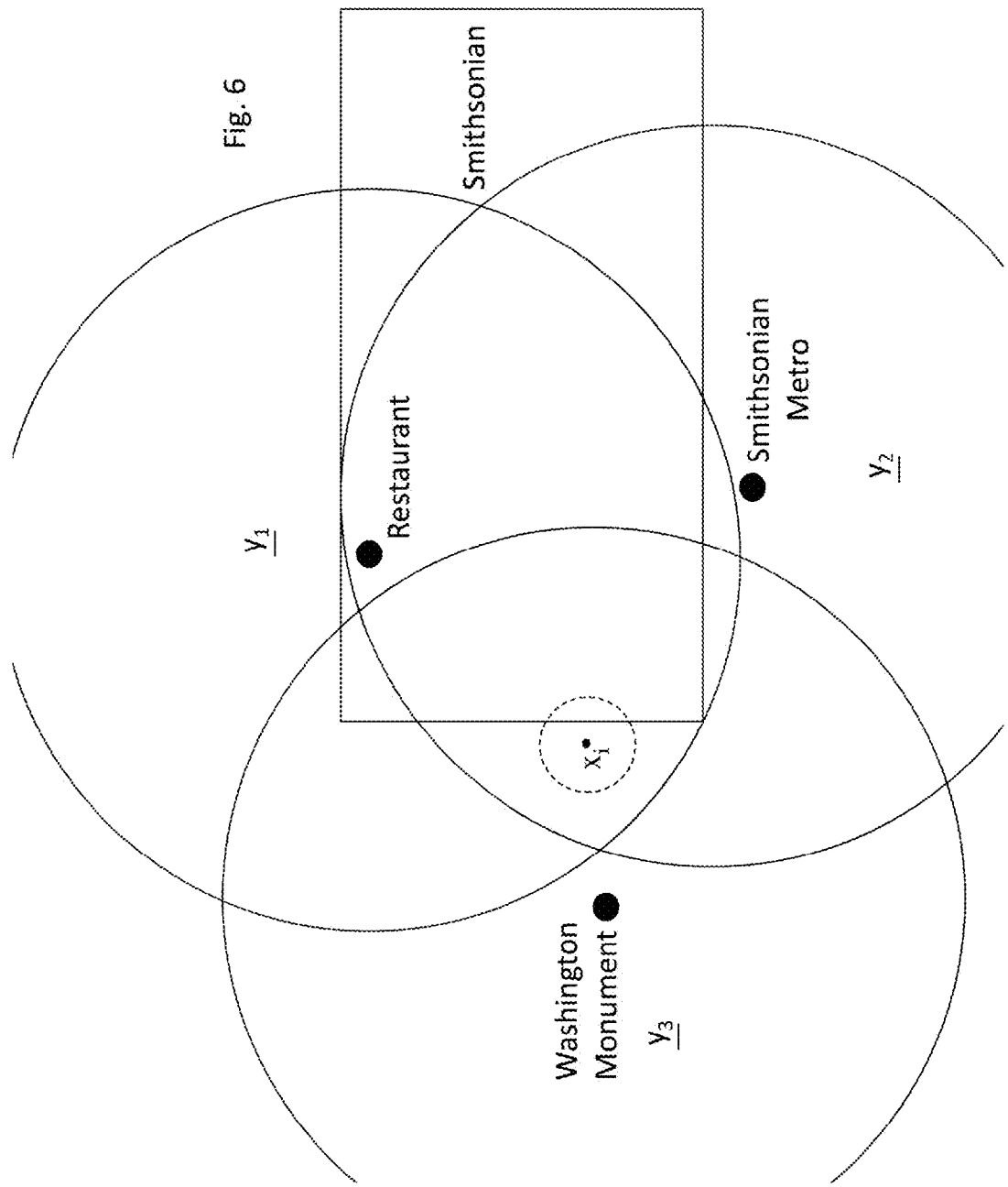
FIG. 6 is a scenario with the AKLs of four different points of interest according to an embodiment of the present invention.

In some embodiments, this may generally be true for multiple $y_j$s (e.g. FIG. 6) in which the "fuzz" of the personal digital device (located at $x_i$) intersects all of the AKLs (e.g. a restaurant AKL $y_1$, the Smithsonian Metro AKL $y_2$, and the Washington Monument AKL $y_3$) simultaneously. In this case, each of the audio tracks $a_j$ would be available to the user and could be displayed as different buttons/icons $b_j$ on their personal digital device 701, as shown in FIG. 7. Each audio track $a_j$ may have a static or dynamic icon or text $b_j$. The user can tap any of the icons $b_j$ to hear the appropriate audio track $a_j$. In the illustrated example, the Washington Monument audio track $a_j$ might be stored audio while the Smithsonian Metro audio track $a_j$ might be streaming information about which trains arrive next, including information about any delays, elevator outages, etc.

In some embodiments, if the audio tracks $a_j$ are relatively small and static, they can be transmitted and stored on the personal digital device, if only temporarily, in anticipation of being used. In some embodiments, if the audio tracks $a_j$ are large, the whole track may not generally be transmitted, but the first part of the track may be transmitted to the personal digital device to increase responsiveness. In some embodiments, e.g. for dynamic audio, the available channels (indicated by the buttons/icons $b_j$ in FIG. 7) may be loaded without stored audio.

In some embodiments, the personal digital device (701) displays buttons/icons $b_j$ (FIG. 7) on its screen (700) when equation (1) is true. Alternatively, the personal digital device may post an alert to indicate the presence of audio sources in the area when equation (1) is true (for this functionality, $f_{alert}$ may be greater than f). In some embodiments, the personal digital device may also launch an app, assuming that it is on the user's personal digital device. In some embodiments, double-clicking the mic on the personal digital device may cause the personal digital device to scan from one channel to another. In some embodiments, the app can interact with the user using speech to, for instance, present channels and listen for commands to change channels. A menu of audio tracks can be presented to the user in many ways such as buttons, icons, or thumbnail displays on a touch screen, as shown in FIG. 7, or a list of options can be announced to the user with the audio output of the personal digital device (e.g., with a speaker, ear buds, Bluetooth™ connected earpiece). Different start points can be offered to the user in a similar manner, e.g. as buttons on a touch screen or announcements over the audio output system of the personal digital device or the result of directing the personal digital device to skip to the next track.

In some embodiments, the app on the personal digital device may provide assistance for blind (or visually impaired) or deaf (or hearing impaired) users. For example, since a blind user cannot see the public display or digital sign, the personal digital device may be set to provide an audible alert to the user when the user enters an AKL. Some available audio tracks may then provide useful information for the user. Alternatively, since a deaf user cannot hear the audio tracks, the personal digital device may be set to present a visual alert on a display screen to the user when the user enters an AKL. Further visual information may then be provided to the user.

In some embodiments, the user's language preference may be a parameter that can be used to sort or filter which audio sources are shown through the display screen 701 (FIG. 7) as available to the user. This feature may modify the display of the buttons/icons $b_j$. Alternatively, the user may select among several languages in which to hear the audio.

The invention claimed is:

1. An electronic system comprising:
a personal digital device that acts as a client to a server that stores an audio track that is to accompany a public display; and
a user interface on the personal digital device through which a user of the personal digital device requests an audio track corresponding to the public display;
and wherein:
the personal digital device receives the audio track through a wireless access point upon the server initiating a stream of the audio track through a connection to the wireless access point;
the personal digital device plays at least some of the audio track to the user; and
the personal digital device checks a location thereof to determine whether the audio track is available.

2. The electronic system of claim 1 wherein:
a frequency of location checking increases as the personal digital device becomes closer to an area within which the audio track is available.

3. The electronic system of claim 1 wherein:
the personal digital device includes a means for selecting among multiple audio tracks in an environment in which the multiple audio tracks are available.

4. The electronic system of claim 3 wherein:
the personal digital device presents a menu of the multiple audio tracks with which the user selects one of the multiple audio tracks.

5. The electronic system of claim 3 wherein:
at least one of the multiple audio tracks does not relate to an available public display.

6. The electronic system of claim 1 wherein:
the personal digital device stores a recently played audio track or a pointer to the recently played audio track.

7. The electronic system of claim 1 wherein:
the personal digital device stores either an additional audio track that is related to a recently played audio track or a pointer to the additional audio track.

8. The electronic system of claim 1 wherein:
the personal digital device controls the play of the audio stream with audio controls including at least one of pause, 1.5× speed, 2× speed, ½× speed, rewind and skip.

9. The electronic system of claim 1 wherein:
the personal digital device includes a means for the user to select among multiple languages in which to hear the audio stream.

10. The electronic system of claim 1 wherein:
the personal digital device includes a means with which the user can select among different start points or tracks for the audio stream.

11. The electronic system of claim 1 wherein:
the personal digital device presents thumbnails of multiple public displays for the user to select a desired audio track.

12. The electronic system of claim 1 wherein:
the personal digital device presents the user interface with a skin that depends on the location of the personal digital device.

* * * * *